United States Patent
Kurtz

(10) Patent No.: US 7,312,096 B2
(45) Date of Patent: Dec. 25, 2007

(54) NANOTUBE SEMICONDUCTOR STRUCTURES WITH VARYING ELECTRICAL PROPERTIES

(75) Inventor: Anthony D. Kurtz, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 11/403,694

(22) Filed: Apr. 13, 2006

(65) Prior Publication Data

US 2007/0034975 A1    Feb. 15, 2007

Related U.S. Application Data

(62) Division of application No. 10/396,176, filed on Mar. 25, 2003.

(51) Int. Cl.
*H01L 21/00* (2006.01)
(52) U.S. Cl. .................. 438/50; 977/864; 977/932
(58) Field of Classification Search .............. 438/50; 977/847, 852, 855, 864, 932, 955
See application file for complete search history.

(56) References Cited

U.S. PATENT DOCUMENTS

| | | | | |
|---|---|---|---|---|
| 4,814,856 A * | 3/1989 | Kurtz et al. | ................ | 338/4 |
| 5,376,241 A | 12/1994 | Shor et al. | ................ | 204/129.3 |
| 5,376,818 A | 12/1994 | Kurtz | ................ | 257/418 |
| 5,834,378 A | 11/1998 | Kurtz et al. | ................ | 438/694 |
| 5,939,732 A | 8/1999 | Kurtz et al. | ................ | 257/77 |
| 6,286,226 B1 * | 9/2001 | Jin | ................ | 33/706 |
| 6,465,132 B1 * | 10/2002 | Jin | ................ | 429/231.8 |
| 6,803,840 B2 * | 10/2004 | Hunt et al. | ................ | 333/186 |
| 6,894,359 B2 * | 5/2005 | Bradley et al. | ................ | 257/414 |

OTHER PUBLICATIONS

Kong et al., "Synthesis of individual single-walled carbon nanotubes on patterned silicon wafers," Nature (395), Oct. 29, 1998, pp. 878-881.
Minot et al., "Tuning Carbon Nanotube Band Gaps with Strain," Physical Review Letters, The American Physical Society, vol. 90, No. 15, Apr. 18, 2003, pp. 156401-1 through 156401-4.
Kane et al., "Size, Shape, and Low Energy Electronic Structure of Carbon Nanotubes," Physical Review Letters, The American Physical Society, vol. 78, No. 10, Mar. 10, 1997, pp. 1932-1935.
Heyd et al., "Uninxial-stress effects on the electronic properties of carbon nanotubes," Physical Review B, The American Physical Society, vol. 55, No. 11, Mar. 15, 1997-1, pp. 6820-6824.

(Continued)

*Primary Examiner*—W. David Coleman
(74) *Attorney, Agent, or Firm*—Plevy Howard PC

(57) ABSTRACT

There is disclosed a nanotube sensor which essentially employs a straight or twisted nanotube deposited on a supporting surface, such as silicon, silicon dioxide and some other semiconductor or metal material. The nanotube is basically a graphite device which is now subjected to stress causing the electrical characteristics of the nanotube to change according to stress. The nanotube is then provided in a circuit, such as a Wheatstone Bridge or other circuit, and the circuit will produce an output signal proportional to the change in electrical characteristics of the nanotube according to the applied force.

4 Claims, 2 Drawing Sheets

OTHER PUBLICATIONS

Yang et al., "Band-gap change of carbon nanotubes: Effect of small uniaxial and torsional strain," Physical Review B, The American Physical Society, vol. 60, No. 19, Nov. 15, 1999, pp. 13874-13878.

Yang et al., "Electronic Structure of Deformed Carbon Nanotubes," Physical Review Letters, The American Physical Society, vol. 85, No. 1, Jul. 3, 2000, pp. 154-157.

Maiti et al., Electronic Transport through Carbon Nanotubes: Effects of Structural Deformation and Tube Chirality, Physical Review Letters, The American Physical Society, vol. 88, No. 12, Mar. 25, 2002, pp. 126805-1 through 126805-4.

Salvetat et al., "Elastic and Shear Moduli of Single-Walled Carbon NaNotube Ropes," Physical Review Letters, The American Physical Society, vol. 82, No. 5, Feb. 1, 1999, pp. 944-947.

Yakobson et al., "Nanomechanics of Carbon Tubes: Instabilities beyond Linear Response," Physical Review Letters, The American Physical Society, vol. 76, No. 14, Apr. 1, 1996, pp. 2511-2514.

Xin et al., Strain energy and Young's modulus of single-wall carbon nanotubes calculated from electronic energy-band theory, Physical Review B The American Physical Society, vol. 62, No. 20, Nov. 15, 2000, pp. 13692-13696.

Lu, "Elastic Properties of Carbon Nanotubes and Nanoropes," Physical Review Letters, The American Physical Society, vol. 79, No. 7, Aug. 18, 1997, pp. 1297-1300.

Bachtold et al., "Scanned Probe Microscopy of Electronic Transport in Carbon Nanotubes," Physical Review Letters, The American Physical Society, vol. 84, No. 26, Jun. 26, 2000, pp. 6082-6085.

Leonard et al., "Novel Length Scales in Nanotube Devices," Physical Review Letters, The American Physical Society, vol. 83, No. 24, Dec. 13, 1999, pp. 5174-5177.

Odintsov, Schottky Barriers in Carbon Nanotube Heterojunctions, Physical Review Letters, The American Physical Society, vol. 85, No. 1, Jul. 3, 2000, pp. 150-153.

Salvetat et al., "Mechanical properties of carbon nanotubes," Applied Physics A, 69, 255-260.

Paulson et al., "In situ resistance measurements of strained carbon nanotubes," Applied Physics Letters, vol. 75, No. 19, Nov. 8, 1999, pp. 2936-2938.

Walters et al., "Elastic strain of freely suspended single-wall carbon nanotube ropes," Applied Physics Letters, vol. 74, No. 25, Jun. 21, 1999, pp. 3803-3805.

Nygard et al., "Quantum dots in suspended single-wall carbon nanotubes," Appied Physics Letters, vol. 79, No. 25, Dec. 17, 2001, pp. 4216-4218.

Franklin et al., "Integration of suspended carbon nanotube arrays into electronic devices and electromechanical systems," Applied Physics Letters, vol. 81, No. 5, Jul. 29, 2002, pp. 913-915.

Park et al., "Electrical cutting and nicking of carbon nanotubes using an atomic force microscope," Applied Physics Letters, vol. 80, No. 23, Jun. 10, 2002, pp. 4446-4448.

Park et al., "Formation of a p-type quantum dot at the end of an n-type carbon nanotube," Applied Physics Letters, vol. 79, No. 9, Aug. 27, 2001, pp. 1363-1365.

Rosenblatt et al., "High Performance Electrolyte Gated Carbon Nanotube Transistors," Nano Letters, vol. 2, No. 8, 2002, pp. 869-872.

Odom et al., "Atomic structure and electronic properties of single-walled carbon nanotubes," Letters to Nature, Nature 391, 1998, pp. 62-64.

Wilder et al., "Electronic structure of atomically resolved carbon nanotubes," Letters to Nature, Nature 391, 1998, pp. 59-62.

Tombler, et al., "Reversible electromechanical characteristics of carbon nanotubes under local-probe manipulation," Letters to Nature, Nature 405, 2000, pp. 769-772.

White et al., "Density of states reflects diameter in nanotubes," Scientific Correspondence, Nature 394, 1998, pp. 29-30.

Yu et al., "Strength and Breaking Mechanism of Multiwalled Carbon Nanotubes Under Tensile Load," Science, vol. 287, Jan. 28, 2000, pp. 637-640.

Rochefort et al., "The effect of structural distortions on the electronic structure of carbon nanotubes," Chemical Physics Letters, Elsevier, Nov. 20, 1998, pp. 45-50.

Hutter, et al., "Calibration of atomic-force microscopes tips," Rev. Sci. Instrum. 64 (7), Jul. 1993, pp. 1868-1873.

Decossas et al., "Interaction forces between carbon nanotubes and an AFM tip," Europhysics Letters, Europhys. Lett., 53 (6), 2001, pp. 742-748.

"Nanotubes for Electronics", by Philip G. Collins and Phaedon Avouris, Scientific American, Dec. 2000, pp. 62-69.

"Cavity Quantum Electrodynamics", by Serge Haroche and Jean-Michel Raimond, Scientific American, Apr. 1993, pp. 54-62.

* cited by examiner

NANOTUBE SEMICONDUCTOR STRUCTURES WITH VARYING ELECTRICAL PROPERTIES

This application is a divisional of U.S. patent application Ser. No. 10/396,176, entitled NANOTUBE SEMICONDUCTOR STRUCTURES WITH VARYING ELECTRICAL PROPERTIES, filed Mar. 25, 2003, the entire disclosure of which is hereby incorporated by reference as if being set forth in its entirety herein.

FIELD OF INVENTION

This invention relates to nanotube structures and, more particularly, to solid state nanotube structures that change their electrical properties under the application of forces or various external conditions.

BACKGROUND OF THE INVENTION

It has long been known that a plurality of nanocrystallites in silicon carbide (SiC) would give rise to an enlargement of the energy gap of the SiC shifting any emitted light towards the UV region because of quantum confinement, which allows the relaxation of momentum selection rules by confining the charge carriers spatially, thus allowing direct band gap transitions. See U.S. Pat. No. 5,376,241 entitled, "Fabricating Porous Silicon Carbide" by A. D. Kurtz et al., which issued on Dec. 27, 1994 and is assigned to Kulite Semiconductor Products, Inc, the assignee herein. In that particular patent, it teaches the formation of porous SiC, which is formed under electrochemical anodization. The patent also describes the production of the semiconductor through the use of ultraviolet light to illuminate the surface of the semiconductor. In this manner, by controlling the light intensity, the potential and THE doping level, a porous layer is formed in the semiconductor and thus one produces porous SiC. The porous SiC can be employed for UV light sources, such as LEDs and diode lasers. Porous SiC can be utilized as a filtering chemical process to be used to provide heterojunction devices.

See U.S. Pat. No. 5,376,818 entitled, "Large Area P-N Junction Devices Formed from Porous Silicon" issued on Dec. 27, 1994 to A. D. Kurtz et al. and assigned to the assignee herein. That patent shows the formation of porous SiC, which is produced under electrochemical anodization. The patent teaches that when a potential is applied to the semiconductor and ultra-violet light illuminates the surface of semiconductor, one can control the light intensity, the potential in doping level, to form a microporous structure in the semiconductor to thus produce porous SiC. The structure enhances the quantum confinement of energetic carriers and which device is highly sensitive to stress.

Reference is also made to U.S. Pat. No. 5,834,378 entitled, "Passivation of Porous Semiconductors for Improved Optoelectronic Device Performance and Fabrication of Light-Emitting Diode Bases on Same". The patent issued on Nov. 10, 1998 to A. D. Kurtz et al. and is assigned to the assignee herein. That patent describes a method which improves the photoluminescent performance of a porous semiconductor. According to the method, a monolayer of passivating material is generated on a pore wall of the porous semiconductor to passivate the porous semiconductor. This layer substantially eliminates dangling bonds and surface states which are associated with the porous semiconductor layer. The resulting passive porous semiconductor layer exhibits a quantum efficiency of approximately five percent. It is indicated that one monolayer of passivating material can be an oxide which is generated by placing the bulk semiconductor substrate into a furnace. Also described is a heterojunction light emitting device which employs a passivated porous semiconductor layer.

U.S. Pat. No. 5,939,732 issued on Aug. 17, 1999 and is entitled, "Vertical Cavity Emitting Porous Silicon Carbide Light Emitting Diode Device and Preparation Thereof" and is assigned to the assignee herein and is invented by A. D. Kurtz et al. That patent teaches a multi-layered light emitting device, which has an active light emitting layer of porous silicon carbide and a sequence of layers of porous SiC underneath which serve as a quarter wavelength multi layer mirror. In this manner, one obtains electroluminescent emission of narrow visible light in the deep blue to UV range in a highly directed pattern. Thus, as indicated above, the nanocrystallites in SiC give rise to an enlargement of the energy gap and shifts emitted light towards the UV region. The same effect has also been demonstrated in silicon. Moreover, when LEDs are made from such materials, the emitted light is shifted towards the UV, the shifting inversely proportional to the size of the nanostructure. It is also well-known that the width of the energy gap may also be effected by the application of stresses (see for instance, deformation potentials). The use of deformation potentials as effecting the energy gap is well-known and is text book material. Thus, it is indicated and known that the effect of stress can cause a change in the frequency of emitted light of an LED or the light resonance of the structure.

In graphite, a similar effect can occur. Normal graphite is a semi-metal, but in a nanostructure it can be a conductor or a semiconductor. For example, see an article entitled, "Nanotubes for Electronics". This article appeared in *Scientific American* in the December 2000 issue. The article describes nanotubes and is written by Phillip G. Collins and Phaedon Avouris. In that article it is clear that nanotubes are utilized because of their unique electronic properties. Carbon nanotubes essentially can be used to perform the same function as silicon does in electronic circuits, but at a molecular scale, where silicon and other semiconductors do not work. In particular, when the dimensions of the nanotube are of the same order of magnitude as the electron wavelength, then these quantum effects can occur at those dimensions.

See also an article entitled, "Cavity Quantum Electrodynamics" which appeared in *Scientific American* in April, 1993 by Serge Haroche and Jean-Michel Raimond. This article explains the operation of atoms and photons and their behavior in small cavities. The article shows that new sensors can be developed utilizing such techniques.

In any event, because of the function and operation of nanotubes, it has been determined that application of stress can change a conductor to a semiconductor by changing the energy gap where the quantum confinement leads to a large change in the electrical properties. Essentially, the electrical properties of nanostructures, such as nanotubes, which exhibit quantum confinement can be changed by the application of various stresses, thus leading to a means of measuring such stresses.

Therefore, the present invention contemplates the formation of a high frequency, high temperature sensor which employs nanotubes and where the nanotubes are subjected to pressure or other external conditions to vary the electrical properties of the nanotubes according to a desired application.

The nanotubes, which are conductive, will respond to an applied pressure to produce an output voltage or current proportional to the amount of pressure applied. These devices, because of their high temperatures properties, as well as because of the electrical properties provide improved transducer structures or sensor structures useful in generating sensors in the optical and microwave ranges.

SUMMARY OF INVENTION

A transducer structure, which comprises a substrate having a surface located thereof at least one nanotube structure, where electrical properties are changed with an applied force, and means coupled to the nanotube and operative to provide an output upon the application of a force applied to the nanotube.

DETAILED DESCRIPTION OF THE FIGURES

Figure 1:
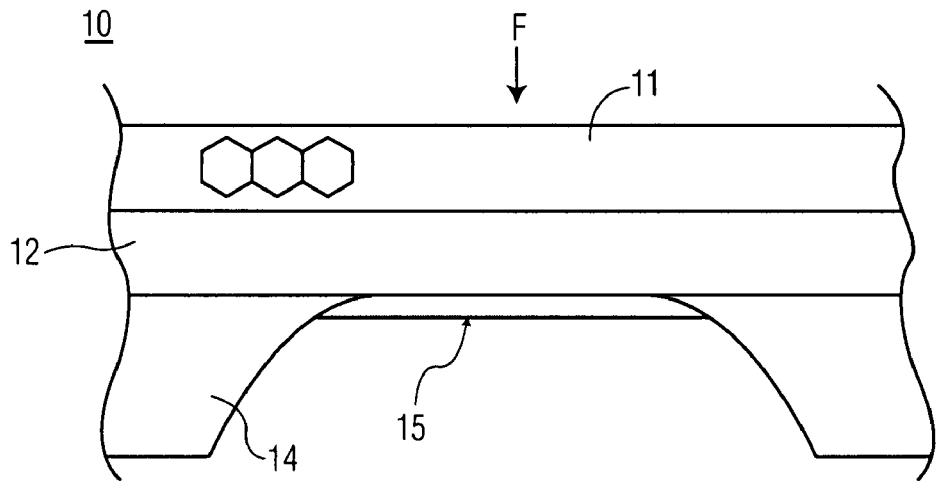
FIG. 1 is a cross-sectional view of a nanotube sensor according to this invention.

Referring to FIG. 1, there is shown a cross-sectional view of a pressure sensor according to the above invention. Essentially, reference numeral 11 refers to a nanotube. The nanotube, as one can understand, is a form of graphite or carbon and is a semi-metal that just barely conducts unless it is provided an external boost. There are straight nanotubes and twisted nanotubes. Essentially, the existence of nanotubes are well-known and one can determine how they are made and how they are developed by reference to the above-noted article, which appeared in *Scientific America*, December 2000 issue, pages 62 through 69. While nanotubes are described, it is known that small tubes or pores can be fabricated in silicon, silicon dioxide, silicon nitride, silicon carbide, as well as other materials.

For example, the above-noted patents show how to make porous structures, such as porous silicon, porous silicon-nitride, as well as porous silicon-carbide. It is known to make micro-porous structures in such materials, including in graphite. Therefore, when one uses the word nanotubes, one is talking also about porous materials or nanostructures. Nanostructures include extremely small pores. The main characteristics of such structures is that the pore size in such materials is on the order of magnitude of the electron wavelength. Thus, the dimensions of the pores or the nanostructures are of the same order of magnitude as the electron wavelength and can accommodate quantum effects at these dimensions.

Therefore, while the present application describes and is devoted mainly to carbon nanotubes, it is also known that nanostructures, which are extremely small structures, can be fabricated in bulk material, such as silicon, silicon-carbide, graphite, as well as other materials. See the above-noted patents for examples on how to do that. Therefore, the present invention also contemplates such nanostructures being fabricated as transducers where the substrate can be silicon or other materials and the material can be porous and therefore, the porous substrate will contain at least one nanotube structure, where the electronic properties of that structure will change with an applied force.

It is well-known that carbon nanotubes do not have the same band gap because for every circumference, there is a different state of valance and conduction states. As one can ascertain, it is an objective of the present invention to subject the nanotube to a force or stress and, based on the amount of stress imported to the nanotube, one can change the electrical properties of the nanotube and thus, provide a sensor device. A nanotube can be formed in many different ways.

As indicated, scientists have constructed field effect transistors (FETs) using semiconducting nanotubes formed between two metal electrodes. The nanotubes act as a channel through which electrons flow. The current flowing in the channel is switched on and off by applying voltages to a third electrode. Such devices operate at room temperature, with electrical characteristics that are reminiscent of silicon. In the article, it is also indicated clearly that semiconducting nanotubes change their electrical resistance dramatically when exposed to alkalis, halogens and other gases at room temperature.

As indicated, nanotubes are sensitive to different chemicals, such as oxygen and water and they may be able to distinguish one chemical or gas from another. It is a present object of the invention, as shown in FIG. 1, to dispose a plurality of nanotubes 11, whether they be straight or twisted nanotubes on the surface of a support substrate. The support surface 12 can be, for example, silicon, metal, silicon carbide or some other material. The surface 12 is bonded to a support layer 14, which may be fabricated from glass, silicon or some other material. As seen, there is depicted an active area 15. When a force is applied to the nanotube 11, as indicated by arrow designated as F, the nanotube 11 changes its electrical characteristics. If the nanotube is in part of a circuit, such as a Wheatstone Bridge arrangement, then the output of the Bridge will change according to the changed electrical characteristics of the nanotube 11 and according to the applied force. In this manner, one can obtain a sensor where the output voltage of the sensor is a function of the applied force F.

Figure 2:
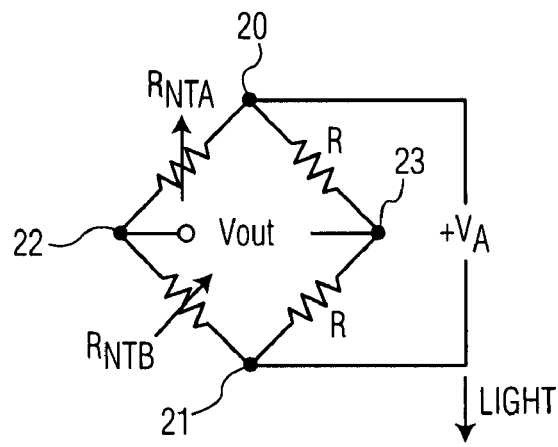
FIG. 2 is a circuit schematic of the Wheatstone Bridge employing a nanotube sensor according to this invention.

FIG. 2 shows a circuit diagram of a Wheatstone Bridge. A Wheatstone Bridge is a very conventional and well-known circuit. As seen in FIG. 2, two nanotubes designated as RNT A and RNT B are arranged in one arm of the Bridge, while the other arm of the Bridge may consist of two fixed resistors. A voltage ($V_A$) is applied to the two terminals 20 and 21 of the Bridge, while the output voltage ($V_{OUT}$) is taken between terminals 22 and 23. While the circuit, of course, shows a typical and well-known Wheatstone Bridge configuration, as indicated, one may employ only a single nanotube sensor in the arrangement or multiple nanotube sensors. Many different configurations are known and anticipated.

Referring back to FIG. 1, it is, of course, understood, that the nanotube 11, as indicated above, is formed by graphite and there are many techniques well-known for providing nanotubes. Layer 12 can be silicon carbide, silicon dioxide, silicon, metal, carbon or, for example, silicon nitride. Layer 14 may also be fabricated from any of the above-noted materials. It is seen that the main reasons for 12 and 14 is to support the nanotube to enable it to receive an applied stress and to therefore, respond accordingly. It is also known that the nanotubes can be utilized in beam type transducers and other transducer configurations. It is also understood that the structure of FIG. 1 can be utilized to detect various chemicals due to the change in the electrical properties of the nanotube when exposed to chemicals.

Therefore, as indicated, the nanotube or sensor of FIG. 1 can be arranged in the Wheatstone Bridge configuration of FIG. 2. The Bridge will produce a different voltage output for the presence of various different substances, such as water, oxygen and various other chemicals, such as hydrogen sulfide, as well as poisonous chemicals.

Figure 3:
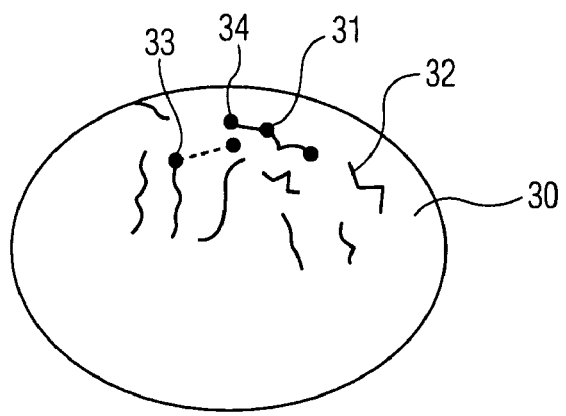
FIG. 3 is a top plan view showing a substrate with a plurality of nanotubes deposited thereon.

Referring to FIG. 3, there is shown a top plan view of a substrate 30 having located and positioned on a top surface a plurality of nanotubes, such as 31, 32, 33 and 34. Essentially, as one can ascertain from the prior art, the fabrications of nanotubes are quite well-known. Nanotubes can be fabricated by utilizing a tube of graphite rods connected to a power supply, which are placed millimeters apart. When the power is connected between the rods, a large current flows and the carbon which is located on the rods vaporizes into a hot plasma. The plasma recondenses in the form of nanotubes. Another technique is called "chemical vapor deposition" or CVD. In this technique, a substrate is placed in an oven and heated to a high temperature, as for example, 600° C. A carbon-bearing gas, such as methane, is slowly added and as the gas decomposes, it frees up carbon atoms, which combine in the form of nanotubes. Another technique is to use a laser to impinge on graphite rods and, based on the intense laser pulses, carbon nanotubes are generated.

As one can ascertain, the nanotubes are conventional and can be easily made. As shown in FIG. 3 the nanotubes, such as 31 and 32, can be secured to the substrate by many conventional techniques, including brushing the nanotubes on the substrate, by applying a paste of nanotubes to the surface of the substrate 30. The substrate 30, of course, can be silicon, silicon dioxide, silicon carbide, silicon nitride or a metal substrate which may be coated with an insulating material to provide isolation of the nanotube such as 31, 32 and 33 from the metal substrate. As indicated, the substrate is shown as reference numeral 12 in FIG. 1 and is reference numeral 30 in FIG. 3.

As one can ascertain, hence, there are a plurality of nanotubes disposed on the surface of the substrate 30. The composition and geometry of nanotubes have electronic characteristics. As indicated, graphite is a very unusual material. Most electrical conductors are semiconductors, but graphite is a semi-metal which is a balance between a metal and a semiconductor. By combining graphite semi-metallic properties with quantum rules and electron waves, the carbon nanotube is a very exotic conductor. However, only one third of all carbon nanotubes combine the right diameter and degree of twists to enable them to act as semiconductors. Therefore, many of the nanotubes, as shown in FIG. 3, would not be semiconductors, but are metallic nanowires. A nanowire, of course, is a good conductor, but has extremely low resistivity. The remaining nanotubes, or approximately two thirds of the nanotubes, are semiconductor devices. Therefore, these devices do not pass current easily without an additional boost of energy. For example, one can use a light beam or a voltage to cause electrons to leave the valance states and move into conducting states. The amount of energy needed depends on a separation between the two levels and is the band gap.

Carbon nanotubes also do not have the same band gap because for every circumference, there is a different set of valances and conduction states. According to one aspect of this invention, one selects those nanotubes which are semiconductor tubes, such as, for example, 31 and 33 and one then connects those nanotubes by means of a wire or by means of a conductive nanotube, such as 34, to form an elongated series resistor of nanotubes. This resistor or nanotube, as indicated in regard to FIG. 1, will change its electrical characteristics based on the application of force. This is also seen, in FIG. 3, that one can apply light to the device when one wishes the device to act as a semiconductor and therefore, the combination of both light and force or either causes the carbon nanotube resistor to change electrical characteristics.

As one can ascertain, it is well-known to connect nanotubes together. Nanotubes can be made to grow specifically on the substrate or other places by controlled growth. Scientists at Stanford University and other universities, have demonstrated that by placing spots of nickel, iron or some, other catalyst on the substrate as 30, they can grow nanotubes in the predetermined places. Thus, as seen in FIG. 3, the semiconductor nanotubes 31, 32 and 33 can be connected together by means of wire nanotubes 34 or by means of other techniques. Nanotubes can be connected together with silicon nanowires and therefore, they can be connected to form the Wheatstone Bridge as, for example, shown in FIG. 2.

Figure 4:
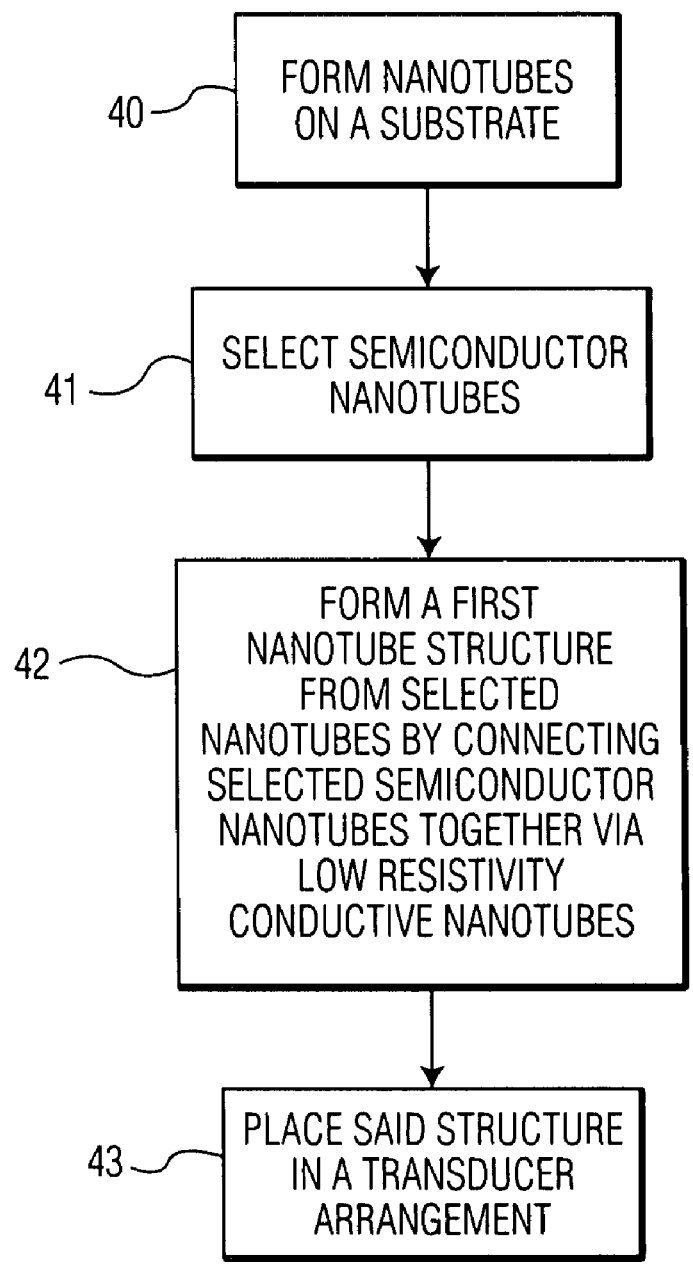
FIG. 4 is a flow diagram showing a method for utilizing nanotubes in a semiconductor structure.

Referring to FIG. 4, there is shown a method according to this invention. Step 40 indicates that one forms or places nanotubes on a conventional substrate as indicated, for example, in FIG. 3. The substrate may be various materials such as silicon, silicon carbide, metal, carbon and so on. The nanotubes can be placed on the substrate by mixing the nanotubes into a composite paste or plastic. The mixed nanotubes in plastic are then painted or otherwise applied to the substrate. In this manner, certain of the nanotubes are wires, while others are semiconductors. Therefore, in the step depicted by numeral 41, one selects the semiconductor nanotubes as, for example, shown in FIG. 3, as 31 and 32. One then connects these nanotubes together by utilizing wire nanotubes or silicon wires to form a first nanotube structure, which essentially is a resistive structure of a given desired resistance. This structure is formed from selected nanotubes, as indicated in step 42. One then places the nanotube structure then formed in a transducer arrangement as shown by reference numeral 43. In this manner, the first plurality of nanotubes is selected on the substrate as semiconductors and they are connected together to form a first nanotube resistance or first nanotube structure.

In a similar manner, other pluralities of nanotubes may be connected together to form another resistive structure. Alternatively, it is understood since some nanotubes are semiconductors and some nanotubes are nanowires, and one can just connect a first plurality of nanotubes one to the other, including both semiconductor nanotubes and wire nanotubes. As one can ascertain, if one connects a wire nanotube in series with two semiconductor nanotubes, one still has a semiconductor nanotube. In this manner, relatively large resistance values can be obtained. The large resistance values can provide sensitive bridge elements. It is further indicated that when a stress or force is applied to the surface of the substrates, the nanotubes will deflect and respond accordingly and therefore, the current through the nanotube will change according to the applied force.

This, as indicated, can be utilized in the bridge circuit or any other circuit configuration to determine the magnitude of the force or stress applied to the structure.

It should become obvious to one skilled in the art that other alternative embodiments would be available and deemed to be encompassed within the scope and breadth of claims as appended hereto.

What is claimed is:

1. A method of forming a pressure transducer comprising:
providing a substrate;

disposing a plurality of nanotube structures on a surface of said substrate, said plurality of nanotube structures having varying resistance values such that each of said plurality of nanotube structures corresponds to one of a conductive nanotube structure having a relatively low resistivity, and a semiconductive nanotube structure having a relatively high resistivity, and wherein at least one electrical property of said semiconductive nanotube structures changes with an applied force;

selectively connecting at least some of said relatively high resistivity semiconductive nanotube structures to one another using at least some of said relatively low resistivity conductive nanotube structures to form a bridge circuit having a plurality of force sensitive bridge elements;

wherein application of a force to said substrate causes a change in current through said bridge circuit according to the applied force.

2. The method of claim 1, wherein the step of disposing said plurality of nanotube structures on the surface of said substrate comprises mixing said nanotube structures to form a composite and applying said composite to said substrate surface.

3. The method of claim 1, wherein the step of providing a substrate further comprises providing one of a silicon, silicon carbide metal, and carbon substrate.

4. The method of claim 1, wherein the force sensitive elements are coupled so as to form a Wheatston Bridge.

* * * * *